US011210057B2

(12) United States Patent
Gielarowski

(10) Patent No.: US 11,210,057 B2
(45) Date of Patent: Dec. 28, 2021

(54) MULTI-USER MEDIA PLAYER GUI

(71) Applicant: James Matthew Gielarowski, Jeffersonville, IN (US)

(72) Inventor: James Matthew Gielarowski, Jeffersonville, IN (US)

(*) Notice: Subject to any disclaimer, the term of this patent is extended or adjusted under 35 U.S.C. 154(b) by 0 days.

(21) Appl. No.: 16/899,073

(22) Filed: Jun. 11, 2020

(65) Prior Publication Data
US 2021/0216268 A1 Jul. 15, 2021

Related U.S. Application Data

(60) Provisional application No. 62/959,863, filed on Jan. 10, 2020.

(51) Int. Cl.
*G06F 3/16* (2006.01)
*G06F 3/048* (2013.01)
*G06F 16/638* (2019.01)
*H04N 21/262* (2011.01)

(52) U.S. Cl.
CPC .............. *G06F 3/165* (2013.01); *G06F 3/048* (2013.01); *G06F 16/639* (2019.01); *H04N 21/26258* (2013.01)

(58) Field of Classification Search
CPC ........ G06F 3/165; G06F 3/048; G06F 16/639; H04N 21/26258
See application file for complete search history.

(56) References Cited

U.S. PATENT DOCUMENTS

| | | | | |
|---|---|---|---|---|
| 7,693,535 B2* | 4/2010 | Dunko | ................... | G06Q 50/10 455/518 |
| 7,937,422 B1* | 5/2011 | Ferguson, Jr. | ...... | G06F 16/4387 707/828 |
| 8,762,847 B2* | 6/2014 | Svendsen | ............... | G11B 27/00 715/716 |
| 10,091,559 B2* | 10/2018 | Goslin | ............... | H04N 21/2665 |
| 10,222,939 B1* | 3/2019 | Lewis | ............... | H04N 21/44008 |
| 10,491,646 B2* | 11/2019 | Rich | ........................ | G06F 16/40 |
| 2005/0286546 A1* | 12/2005 | Bassoli | ................ | G11B 27/105 370/432 |
| 2006/0059535 A1* | 3/2006 | D'Avello | ............. | H04N 21/458 725/139 |
| 2006/0179078 A1* | 8/2006 | McLean | ................ | G06F 16/435 |
| 2006/0195521 A1* | 8/2006 | New | ...................... | H04L 63/105 709/204 |
| 2007/0199014 A1* | 8/2007 | Clark | ...................... | H04N 21/47 725/30 |
| 2008/0162668 A1* | 7/2008 | Miller | ................... | H04L 65/403 709/219 |
| 2008/0229215 A1* | 9/2008 | Baron | ..................... | G06N 3/006 715/751 |
| 2009/0249222 A1* | 10/2009 | Schmidt | ................. | H04L 51/32 715/751 |
| 2010/0042595 A1* | 2/2010 | Chen | .................... | G11B 27/326 707/728 |
| 2010/0043020 A1* | 2/2010 | Basso | .............. | H04N 21/26258 725/1 |

(Continued)

OTHER PUBLICATIONS

CNET, Let Guests DJ Your Party (2013) (Year: 2013).*
Jukestar online website (Year: 2020).*

*Primary Examiner* — James T Tsai

(57) ABSTRACT

The Multi-User Media Player GUI is a user interfaces designed to manage media players that allow group sessions.

21 Claims, 3 Drawing Sheets

Example of Standard Room Group Session in a portrait orientation

(56) References Cited

U.S. PATENT DOCUMENTS

| | | | | |
|---|---|---|---|---|
| 2010/0106730 | A1* | 4/2010 | Aminian | G06Q 10/10 |
| | | | | 707/748 |
| 2011/0047598 | A1* | 2/2011 | Lindley | H04L 63/101 |
| | | | | 726/4 |
| 2011/0125712 | A1* | 5/2011 | Kaila | G06F 16/44 |
| | | | | 707/626 |
| 2013/0005465 | A1* | 1/2013 | Murphy | A63F 13/814 |
| | | | | 463/35 |
| 2013/0252729 | A1* | 9/2013 | Wells | G06Q 30/0601 |
| | | | | 463/31 |
| 2013/0290818 | A1* | 10/2013 | Arrasvuori | H04N 21/4532 |
| | | | | 715/201 |
| 2014/0059567 | A1* | 2/2014 | Wilson | G06F 9/451 |
| | | | | 719/318 |
| 2015/0193194 | A1* | 7/2015 | Ahmed | G11B 27/10 |
| | | | | 700/94 |
| 2015/0319288 | A1* | 11/2015 | Kahn | H04M 1/72442 |
| | | | | 455/41.2 |
| 2015/0334168 | A1* | 11/2015 | Kosslyn | H04L 67/10 |
| | | | | 709/204 |
| 2016/0103589 | A1* | 4/2016 | Dziuk | G06F 3/04883 |
| | | | | 715/716 |
| 2017/0039228 | A1* | 2/2017 | Skafi | G06F 16/219 |
| 2017/0093943 | A1* | 3/2017 | Alsina | H04L 67/1095 |
| 2018/0060320 | A1* | 3/2018 | Oganian | G06Q 20/403 |
| 2018/0225081 | A1* | 8/2018 | Dange | H04L 65/604 |
| 2018/0234765 | A1* | 8/2018 | Torok | G06F 3/165 |
| 2019/0091558 | A1* | 3/2019 | Bealke | A63F 3/00119 |
| 2020/0137011 | A1* | 4/2020 | Guthery | H04L 51/04 |
| 2020/0404374 | A1* | 12/2020 | Keeney | G06F 3/165 |
| 2021/0141472 | A1* | 5/2021 | Beaumier | H05K 5/0247 |
| 2021/0160361 | A1* | 5/2021 | Knight | H04L 51/32 |

* cited by examiner (Figure 1 – Examples of a standard room layout in a portrait orientation without a room host indicator or user input area displayed)
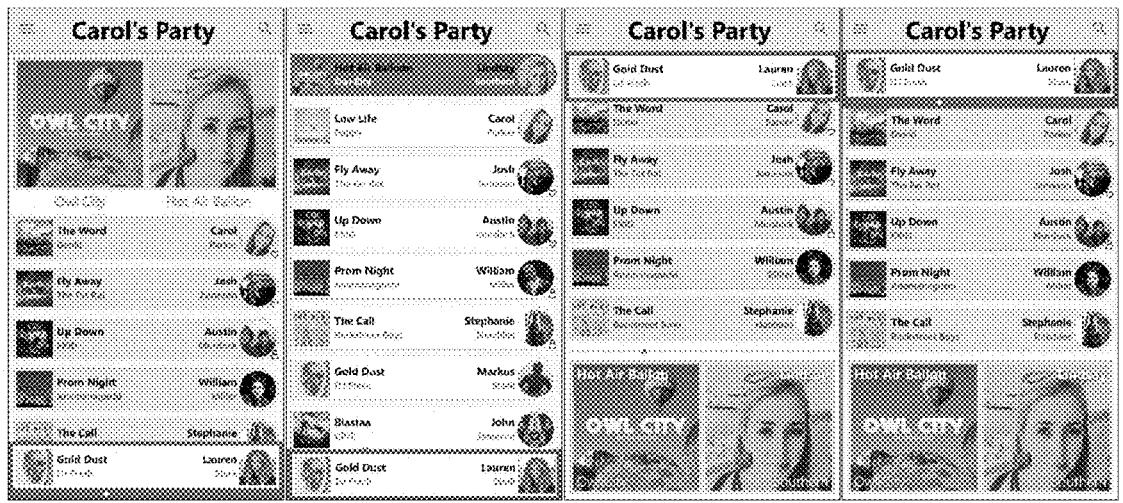
(Figure 2a - Member Content Example)
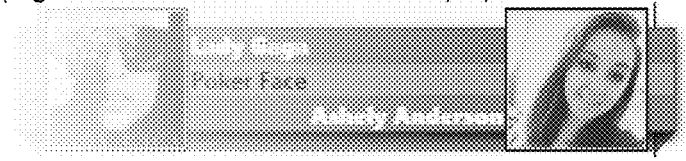
(Figure 2b - Member Suggested Content Example)
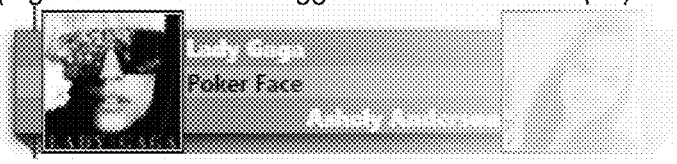

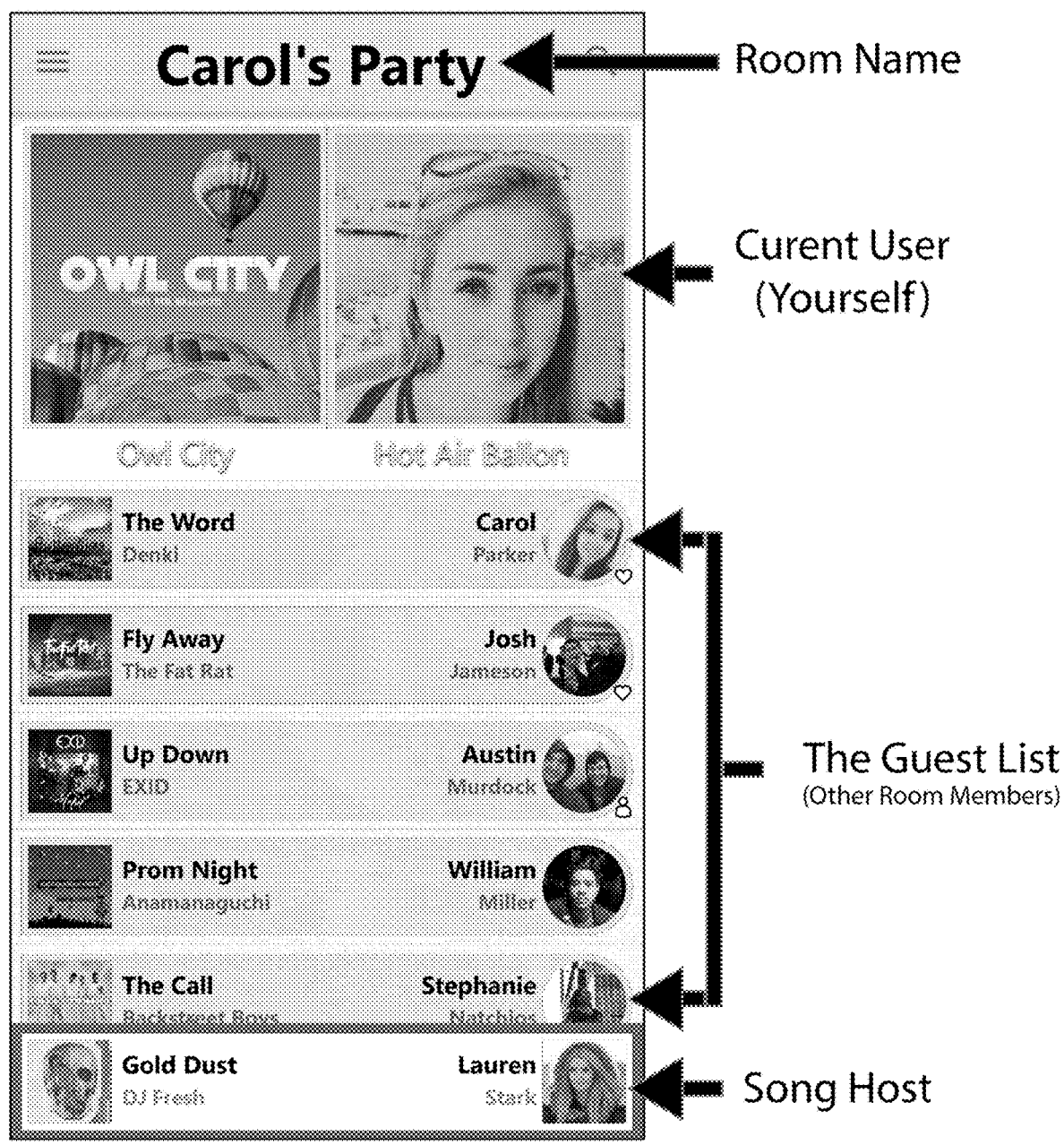
(Figure 3 - Example of Standard Room Group Session in a portrait orientation)

(Figure 4a - Example of the content shown while in a room and the playlist source)
(Figure 4b - Example of selecting your designated playlist)

MULTI-USER MEDIA PLAYER GUI

The Multi-User Media Player GUI was designed to work with media players in which multiple users collectively contribute to a dynamic group playlist. The MUMPGUI was designed for, but not limited to, 2 of my future applications.

The first is JukeBox, a social media music application that allows multiple users to create sessions where each participating individual contributes their selected playlist to a group playlist. Each member contributes a song suggestion to the group from a designated playlist that they have selected. Members take turns, in a variety of ways, having their suggested song played for the group. Once a member's song is played, they will have the next or random song in their designated playlist presented to the group as their new suggested content.

Song-Sync is an advanced version of JukeBox, where each participating member can play the current active song in synchronization with other participating members.

At the heart of each application resides The Multi-User Media Player GUI, which possesses the core components when in a Room/Group Session.

FIG. 1—EXAMPLES OF A STANDARD ROOM LAYOUT IN A PORTRAIT ORIENTATION WITHOUT A ROOM HOST INDICATOR OR USER INPUT AREA DISPLAYED

The Core Components for Member Content

Each Group Session will contain multiple people, and each person will contribute a playlist containing multiple songs. While in the main GUI, each member will be represented by 2 fundamental parts within each Member Section.
1. The content and information for the Participating Member. (Clicking this will open information and options related to each member. E.g. profile information, options, and numerous statuses.)

FIG. 2a—MEMBER CONTENT EXAMPLE

2. The content and information for the Members Suggested Content. (Clicking this will expand information and options about the corresponding suggested content. E.g. artist, album, and song.)

FIG. 2b—MEMBER SUGGESTED CONTENT EXAMPLE

"FIG. 2a & FIG. 2b" show this content arrange horizontally. However, this can be arranged various ways and can include any information related for the 2 fundamental parts.

The Core Components of a Standard Group Session
1. Room Host—is the member who has created the room for the Group Session. This user controls several room settings and functions that manage the rooms activity and member privileges. An optional indicator on their profile picture denotes this member as the creator to the rest of the group.
2. Room Name—displays the title of the Room/Group Session. This is created by the Room Host, which can be used for members searching for rooms to join. (This does not need to be displayed on the main GUI; however, it must exist and be accessible.
3. Play Host—This describes the user whose device is participating in audio playback. An optional indicator within their Member Section denotes this member as a Play Host to the rest of the group.
4. Current User—refers to the individual (Yourself) who is using the application and will be presented within the Active User Area or can be presented within the Guest List.
5. Room Members—refers to all users that are participating in the Group Session. These members are displayed amongst the Guest List. The order in which guests are displayed is unique to each member, based on preferences. E.G. favorites, friends, etc.
6. Song Host—is the room member who is currently having their suggested content being played and displayed amongst the Room Activity Area.

In JukeBox, there is only one Play Host. This means, in a Group Session, they are the only member in which their device has audio playback.

In Song-Sync, multiple members can use their device for audio playback in synchronization with the group. Each member that is participating in synchronized playback will have their Member Section denoted to represent them as a participant and active Play Host.

Example of a Standard Room Group Session Using MUMPGUI Components

FIG. 3—EXAMPLE OF STANDARD ROOM GROUP SESSION IN A PORTRAIT ORIENTATION

"FIG. 3" is one example of a Standard Room Group Session in a portrait orientation. It does not contain an indicator for the Room Host and does not feature settings to allow user input. As well as the Notification Area is set to reveal upon activity. It is also important to note that in this specific example, the Current User does not have their own name presented on their own screen. Instead the information below the Current User will be the song name corresponding to their selected content. This is done for increased legibility of the Current User's content.

Main GUI Layout Components
1. Room Activity Area—This section displays the current media playing and the member that selected it. Ideally, this will be presented in the same location that the media player displays the current media in progress. Other informational content within this area would be typical (E.g. Song progress information).
2. The Guest List/Room Members Area—This area displays all member within the group session. The Current User can be presented within this list or a designated area.
3. Room Notifications Area—This area displays changes to the room's activity. (E.g. members joining the room, leaving the room, more notifications with different room types, etc.) This section does not have to remain constantly visible, as this will only display notifications about changes to the room.
4. User Input Area—This area allows members to interact with the room when the room settings and type permits or requests input. Although this is not an essential part of a standard room, it plays a big rool in other various room types.

Other room sections will vary for navigational purposes of individual media players. (This could range from hideaway menus to fixed buttons and information displayed.)

User Playlist Functionality within a Group Session

Each member can designate a playlist to be used while in a group session. This designated playlist can be selected by expanding the options on any playlist. When designated, the user will also be able to choose the progression of their individual list as each song is played. (E.g. sequential, random, etc.)

FIG. 4a—EXAMPLE OF THE CONTENT SHOWN WHILE IN A ROOM AND THE PLAYLIST SOURCE

FIG. 4b—EXAMPLE OF SELECTING YOUR DESIGNATED PLAYLIST

In this specific example it is listed as "My JukeBox Playlist"
Room Types
While in a Group Session, the way in which new song host is selected will vary depending on its room type and setting. The room type and its unique options are selected by the Room Creator/Host and displayed on the "room details" page before joining.
There are three main modes:
Random—This mode will simply select a new person and their song at random. Once a guest has joined, they need not do anything more to have their songs played.
Party—This mode allows the creator to pick from many interactive ways to choose the next Song Host. This room type will be further expanded to include a variety of trivia, mini-games, and more.
Voting—This mode gives the creator many voting based option to select the song host. Where each turn Guests can vote among the group to see who goes next.
Song-Sync's Room types will be built off the same three core room types with and added type called Full Control. This mode is for user who will host and choose all content being played with all other connected devices. Participating members will still be in synchronization with media, but only one device will be choosing the content.

What is claimed is:

1. A method for displaying and managing a user interface of a room created by a room host, comprising:
    displaying the user interface on a display device, wherein the user interface comprises a list of members of a group session and wherein each member is displayed while adjoined to corresponding suggested media content;
    receiving the corresponding suggested media content from the corresponding members of the group session;
    configuring the room with a room type option corresponding to the group session based on the room host's selection of a room type, wherein the room type is one of a random selection, a game from which a winner is selected as the song host and voting by the members to select the song host;
    determining an order of progression from the received suggested media content, wherein the determining comprises selecting a song host from the received suggested media content's corresponding members based on the room type;
    playing the suggested media content in accordance with the determined order of progression;
    displaying on the user interface, after configuring the room, comprising a currently-playing media content while adjoined to the song host with a visual indicator different from the other members of the group session; and
    updating the user interface as the media content is played in the order of progression in accordance with the displaying on the user interface a currently-playing media content step and associated song host.

2. The method of claim 1, in which a member's suggested media content contribution is derived from a member-designated playlist selected to be used in group sessions.

3. The method of claim 2, in which the member-designated playlist is assigned and identified within the options of any playlist within the list of member's personal playlists.

4. The method of claim 2, wherein an order in which content from a user's designated playlist progression is ordered or randomized.

5. The method of claim 1, wherein selecting a member's information or image can expand member related info.

6. The method of claim 1, in which clicking on a member's suggested content expands related content information.

7. The method of claim 1, wherein the order in which members are displayed are unique to each member, based on predetermined preferences or member relationship status.

8. One or more non-transitory computer readable media containing computer executable instructions for performing a method for displaying and managing a user interface of a room created by a room host, the media comprising:
    code for displaying the user interface on a display device, wherein the user interface comprises a list of members of a group session and wherein each member is displayed while adjoined to a corresponding suggested media content;
    code for receiving the corresponding suggested media content from the corresponding members of the group session;
    code for configuring the room with a room type option corresponding to the group session based on the room host's selection of a room type, wherein the room type is one of a random selection, a game from which a winner is selected as the song host and voting by the members to select the song host;
    code for determining an order of progression from the received suggested media content, wherein the determining comprises selecting a song host from the received suggested media content's corresponding members based on the room type;
    code for playing the suggested media content in accordance with the determined order of progression;
    code for displaying on the user interface, after configuring the room, comprising a currently-playing media content while adjoined to the song host with a visual indicator different from the other members of the group session; and
    code for updating the user interface as the media content is played in the order of progression in accordance with the displaying on the user interface a currently-playing media content step and associated song host.

9. The media of claim 8, in which a member's suggested media content contribution is derived from a member-designated playlist selected to be used in group sessions.

10. The media of claim 9, in which the member-designated playlist is assigned and identified within the options of any playlist within the list of member's personal playlists.

11. The media of claim 8, wherein an order in which content from a user's designated playlist progression is ordered or randomized.

12. The media of claim 8, wherein selecting a member's information or image can expand member related info.

13. The media of claim 8, in which clicking on a member's suggested content expands related content information.

14. The media of claim 8, wherein the order in which members are displayed are unique to each member, based on predetermined preferences or member relationship status.

15. An apparatus comprising:
a processor;
and an application for displaying and managing a user interface of a room created by a room host, operated by to the processor to:
display the user interface on a display device, wherein the user interface comprises a list of members of a group session and wherein each member is displayed while adjoined to a corresponding suggested media content;
receive the corresponding suggested media content from the corresponding members of the group session;
configure the room with a room type option corresponding to the group session based on the room host's selection of a room type, wherein the room type is one of a random selection, a game from which a winner is selected as the song host and voting by the members to select the song host;
  determine an order of progression from the received suggested media content, wherein the determining comprises selecting a song host from the received suggested media content's corresponding members based on the room type;
play the suggested media content in accordance with the determined order of progression;
display on the user interface, after configuring the room, comprising a currently-playing media content while adjoined to the song host with a visual indicator different from the other members of the group session; and
update the user interface as the media content is played in the order of progression in accordance with the displaying on the user interface a currently-playing media content step and associated song host.

16. The apparatus of claim 15, in which a member's suggested media content contribution is derived from a member-designated playlist selected to be used in group sessions.

17. The apparatus of claim 16, in which the member-designated playlist is assigned and identified within the options of any playlist within the list of member's personal playlists.

18. The apparatus of claim 15, wherein an order in which content from a user's designated playlist progression is ordered or randomized.

19. The apparatus of claim 15, wherein selecting a member's information or image can expand member related info.

20. The apparatus of claim 15, in which clicking on a member's suggested content expands related content information.

21. The apparatus of claim 15, wherein the order in which members are displayed are unique to each member, based on predetermined preferences or member relationship status.

* * * * *